United States Patent
Pan et al.

(10) Patent No.: US 11,129,020 B2
(45) Date of Patent: Sep. 21, 2021

(54) METHOD AND DEVICE FOR ESTABLISHING CONNECTION TO WIRELESS ACCESS POINT

(71) Applicant: SHANGHAI SHANGWANG NETWORK TECHNOLOGY CO., LTD., Shanghai (CN)

(72) Inventors: Junwu Pan, Shanghai (CN); Xiyi Yin, Shanghai (CN)

(73) Assignee: SHANGHAI SHANGWANG NETWORK TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/680,524

(22) Filed: Nov. 12, 2019

(65) Prior Publication Data

US 2020/0084630 A1 Mar. 12, 2020

Related U.S. Application Data

(63) Continuation of application No. PCT/CN2018/086509, filed on May 11, 2018.

(30) Foreign Application Priority Data

May 12, 2017 (CN) .......................... 201710335504.2

(51) Int. Cl.
*H04W 12/06* (2021.01)
*H04W 76/14* (2018.01)
(Continued)

(52) U.S. Cl.
CPC ............. *H04W 12/06* (2013.01); *H04W 8/18* (2013.01); *H04W 12/068* (2021.01);
(Continued)

(58) Field of Classification Search
CPC . H04W 12/06; H04W 76/14; H04W 12/0608; H04W 12/0804;
(Continued)

(56) References Cited

U.S. PATENT DOCUMENTS

2006/0239265 A1* 10/2006 Son ........................ H04L 12/189
370/390
2011/0134887 A1* 6/2011 Jeon ................... H04W 12/0602
370/331
2014/0370879 A1* 12/2014 Redding ........... H04M 3/42178
455/419

FOREIGN PATENT DOCUMENTS

CN 106102061 A 11/2016
CN 106304057 A 1/2017
(Continued)

*Primary Examiner* — Dinh Nguyen
(74) *Attorney, Agent, or Firm* — Bayramoglu Law Offices LLC

(57) ABSTRACT

A method for establishing a connection to a wireless access point includes: sending, based on an operation of establishing a connection to a target wireless access point by a user in an application of a user equipment, a connection request to a wireless routing device corresponding to the target wireless access point by the user equipment, wherein the connection request includes connection authentication information generated by the user equipment; receiving connection success information sent by the wireless routing device by the user equipment after connection authentication on the connection request succeeds.

14 Claims, 4 Drawing Sheets

(51) Int. Cl.
*H04W 8/18* (2009.01)
*H04W 12/71* (2021.01)
*H04W 12/72* (2021.01)
*H04W 12/084* (2021.01)
*H04W 12/121* (2021.01)

(52) U.S. Cl.
CPC ......... *H04W 12/084* (2021.01); *H04W 12/71* (2021.01); *H04W 12/72* (2021.01); *H04W 76/14* (2018.02); *H04W 12/121* (2021.01)

(58) Field of Classification Search
CPC ..... H04W 12/00514; H04W 12/00512; H04W 8/18; H04W 12/1201; H04W 12/72; H04W 12/068; H04W 12/084; H04W 12/71; H04W 12/121
See application file for complete search history.

(56) References Cited

FOREIGN PATENT DOCUMENTS

| | | |
|---|---|---|
| CN | 106412902 A | 2/2017 |
| CN | 107148019 A | 9/2017 |
| EP | 2731396 A1 | 5/2014 |

\* cited by examiner

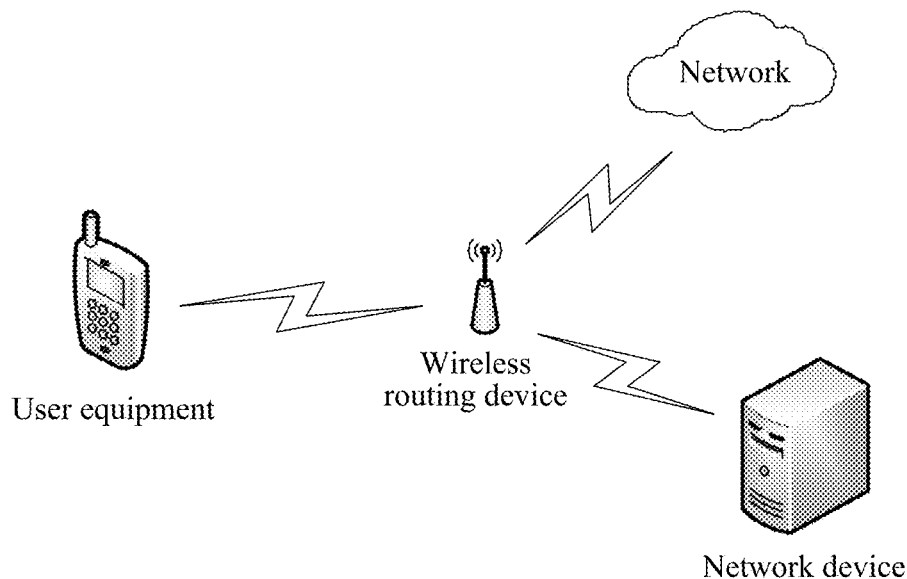

FIG. 1

| S11 |
|---|
| Send, based on an operation of establishing a connection to a target wireless access point by a user in an application of a user equipment, a connection request to a wireless routing device corresponding to the target wireless access point, the connection request including connection authentication information generated by the user equipment |

| S12 |
|---|
| Receive connection success information sent by the wireless routing device after connection authentication on the connection request succeeds |

S11a — Generate connection authentication information based on service data information for communication between a user equipment and a target wireless access point when an operation of establishing a connection to the target wireless access point by a user in an application of the user equipment is obtained S11b — Send the connection request to a wireless routing device corresponding to the target wireless access point, the connection request including the connection authentication information

FIG. 3

S21 — Receive a connection request about a target wireless access point sent by a user equipment, the connection request including connection authentication information generated by the user equipment S22 — Perform connection authentication on the connection request based on the connection authentication information S23 — Accept the connection request and return connection success information to the user equipment when connection authentication on the connection request succeeds

FIG. 4

METHOD AND DEVICE FOR ESTABLISHING CONNECTION TO WIRELESS ACCESS POINT

CROSS REFERENCE TO THE RELATED APPLICATIONS

This application is the national phase entry of continuation application of International Application No. PCT/CN2018/086509, filed on May 11, 2018, which is based upon and claims priority to Chinese Patent Application No. 201710335504.2, filed on May 12, 2017, the entire contents of which are incorporated herein by reference.

TECHNICAL FIELD

This application relates to the communications field, and in particular, to a technology for establishing a connection to a wireless access point.

BACKGROUND

When a wireless device accesses a wireless network, authentication on the wireless device needs to be completed to ensure security of a wireless link, and a subsequent association phase can be entered only after the authentication succeeds. Generally, there are two mechanisms for link authentication (for example, an IEEE 802.11 link): open system authentication and pre-shared key (network password) authentication.

If network password authentication is adopted, a fixed network password is set in the background of a wireless router, a to-be-authenticated device is connected using the same network password, and the preset network password usually needs to be manually entered in a connection process. As a result, the connection process is cumbersome and error-prone, and a to-be-connected device cannot be effectively controlled because other users can also be connected to the wireless router based on the password once the password is leaked. A risk of password leakage can be effectively reduced by frequently changing the password. However, once the router changes the network password, each previously connected device needs to reset the password accordingly to continue to access the wireless network. This process is also cumbersome, and user's enthusiasm for periodically changing the password is not high.

If a passwordless connection is used, although the wireless device can be connected after scanning an SSID of the wireless router, access authentication needs to be subsequently performed as required, and an authentication process is performed by interactively entering information on a webpage. Consequently, a use threshold is relatively high and a connection conversion rate is relatively low.

SUMMARY

An objective of this application is to provide a technology for establishing a connection to a wireless access point.

According to one aspect of this application, a method for establishing a connection to a wireless access point at a user equipment side is provided, and the method includes:

sending, based on an operation of establishing a connection to a target wireless access point by a user in an application of a user equipment, a connection request to a wireless routing device corresponding to the target wireless access point, the connection request including connection authentication information generated by the user equipment; and receiving connection success information sent by the wireless routing device after connection authentication on the connection request succeeds.

According to another aspect of this application, a method for establishing a connection to a wireless access point at a wireless routing device side is provided, and the method includes:

receiving a connection request about a target wireless access point sent by a user equipment, the connection request including connection authentication information generated by the user equipment;

performing connection authentication on the connection request based on the connection authentication information; and accepting the connection request and returning connection success information to the user equipment when connection authentication on the connection request succeeds.

According to still another aspect of this application, a method for establishing a connection to a wireless access point at a network device side is provided, and the method includes:

receiving connection authentication information that is sent by a corresponding wireless routing device and that is about requesting performed by a user equipment to establish a connection to a target wireless access point, the connection authentication information being generated by the user equipment;

performing connection authentication on the connection authentication information; and returning corresponding authentication result information to the wireless routing device.

According to yet another aspect of this application, a method for establishing a connection to a wireless access point is provided, and the method includes:

sending, by a user equipment based on an operation of establishing a connection to a target wireless access point by a user in an application of the user equipment, a connection request to a wireless routing device corresponding to the target wireless access point, the connection request including connection authentication information generated by the user equipment;

receiving, by the wireless routing device, the connection request, performing connection authentication on the connection request based on the connection authentication information, and accepting the connection request and returning connection success information to the user equipment when connection authentication on the connection request succeeds; and receiving, by the user equipment, the connection success information.

According to one aspect of this application, a device for establishing a connection to a wireless access point is provided, and the device includes:

a processor; and a memory configured to store a computer executable instruction that, when executed, causes the processor to perform the following operations:

sending, based on an operation of establishing a connection to a target wireless access point by a user in an application of a user equipment, a connection request to a wireless routing device corresponding to the target wireless access point, the connection request including connection authentication information generated by the user equipment; and receiving connection success information sent by the wireless routing device after connection authentication on the connection request succeeds.

According to another aspect of this application, a wireless routing device for establishing a connection to a wireless access point is provided, and the wireless routing device includes:

a processor; and a memory configured to store a computer executable instruction that, when executed, causes the processor to perform the following operations:

receiving a connection request about a target wireless access point sent by a user equipment, the connection request including connection authentication information generated by the user equipment;

performing connection authentication on the connection request based on the connection authentication information; and accepting the connection request and returning connection success information to the user equipment when connection authentication on the connection request succeeds.

According to still another aspect of this application, a network device for establishing a connection to a wireless access point is provided, and the network device includes:

a processor; and a memory configured to store a computer executable instruction that, when executed, causes the processor to perform the following operations:

receiving connection authentication information that is sent by a corresponding wireless routing device and that is about requesting performed by a user equipment to establish a connection to a target wireless access point, the connection authentication information being generated by the user equipment;

performing connection authentication on the connection authentication information; and returning corresponding authentication result information to the wireless routing device.

According to one aspect of this application, a computer readable medium including an instruction is provided, and when executed, the instruction causes a system to perform the following operations:

sending, based on an operation of establishing a connection to a target wireless access point by a user in an application of a user equipment, a connection request to a wireless routing device corresponding to the target wireless access point, the connection request including connection authentication information generated by the user equipment; and receiving connection success information sent by the wireless routing device after connection authentication on the connection request succeeds.

According to another aspect of this application, a computer readable medium including an instruction is provided, and when executed, the instruction causes a system to perform the following operations:

receiving a connection request about a target wireless access point sent by a user equipment, the connection request including connection authentication information generated by the user equipment;

performing connection authentication on the connection request based on the connection authentication information; and accepting the connection request and returning connection success information to the user equipment when connection authentication on the connection request succeeds.

According to still another aspect of this application, a computer readable medium including an instruction is provided, and when executed, the instruction causes a system to perform the following operations:

receiving connection authentication information that is sent by a corresponding wireless routing device and that is about requesting performed by a user equipment to establish a connection to a target wireless access point, the connection authentication information being generated by the user equipment;

performing connection authentication on the connection authentication information; and returning corresponding authentication result information to the wireless routing device.

Compared with the prior art, this application has at least the following beneficial effects:

(1) An operation process of connecting a wireless device to a wireless access point is simplified without manual entering of a password. In addition, because an authentication process is performed at a network device (for example, a server) side, different wireless access points can be connected at any time without obtaining a password of each wireless access point.

(2) A possibility of network password leakage is greatly reduced, and an illegal user is prevented from establishing a connection to a wireless access point through a replay attack, thereby improving security of a user equipment and a wireless network.

(3) Connection authentication based on a network device (for example, a server) facilitates customization of control policies (for example, connection duration or traffic) for different user equipments, thereby implementing precise identification and control on the user equipments and conveniently counting service data of each user equipment.

BRIEF DESCRIPTION OF THE DRAWINGS

Other features, objectives, and advantages of the present application will become more obvious by reading the detailed description of non-limiting embodiments that is provided with reference to the following accompanying drawings:

FIG. 1 is a system topology diagram for establishing a connection to a wireless access point according to an embodiment of this application.

FIG. 2 is a flowchart of a method for establishing a connection to a wireless access point at a user equipment side according to an embodiment of this application.

FIG. 3 is a flowchart of a substep of one step in FIG. 2.

FIG. 4 is a flowchart of a method for establishing a connection to a wireless access point at a wireless routing device side according to another embodiment of this application.

The same or similar reference numerals in the drawings indicate the same or similar parts.

DETAILED DESCRIPTION OF THE EMBODIMENTS

Figure 5:
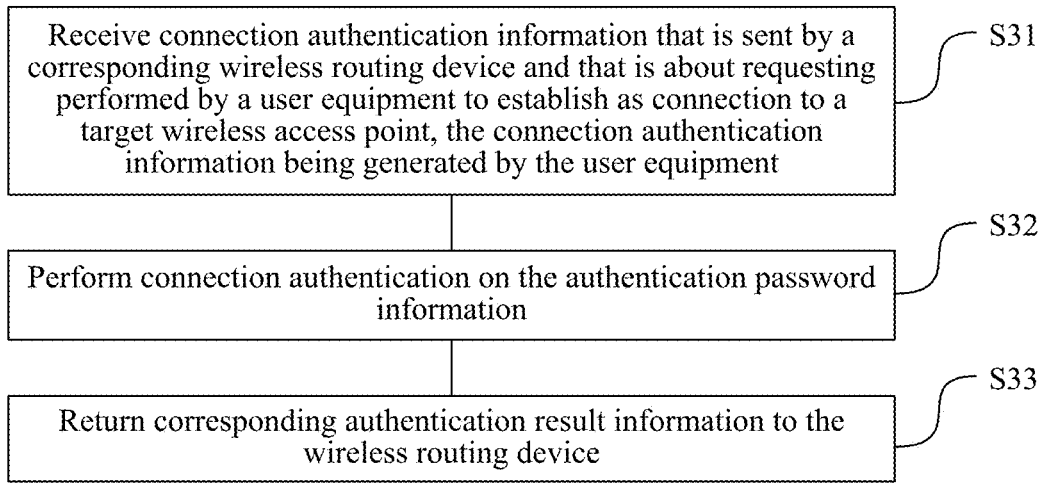
FIG. 5 is a flowchart of a method for establishing a connection to a wireless access point at a network device side according to still another embodiment of this application.

The following further describes this application in detail with reference to accompanying drawings.

In a typical configuration in this application, each of a terminal, a service network device, and a trusted party includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access.

The device in this application includes but is not limited to a user equipment, a network device, or a device formed by integrating the user equipment and the network device through a network. The user equipment includes, but is not limited to, any mobile electronic product that can perform human-computer interaction with a user (for example, human-computer interaction through a touchpad), such as a smart phone, a tablet computer, and the like, and the mobile electronic product can adopt any operating system, such as an android operating system, an iOS operating system, and the like. The network device includes an electronic device capable of automatically performing numerical calculation and information processing according to an instruction set or stored in advance, and hardware of the network device includes but is not limited to a microprocessor, an application specific integrated circuit (ASIC), a programmable logic device (PLD), a field programmable gate array (FPGA), a digital signal processor (DSP), an embedded device, and the like. The network device includes, but is not limited to, a computer, a network host, a single network server, a plurality of network server sets, or a cloud composed of a plurality of servers. In this case, the cloud is composed of a large quantity of computers or network servers based on cloud computing. Cloud computing is a type of distributed computing, and is a virtual supercomputer composed of a group of loosely coupled computer sets. The network includes, but is not limited to, the Internet, a wide area network, a metropolitan area network, a local area network, a VPN network, a wireless ad hoc network, and the like. Preferably, the device may also be a program run on the user equipment, the network device, or the user equipment and the network device, the network device, a touch terminal, or a device formed by integrating the network device and the touch terminal through a network.

Certainly, a person skilled in the art should understand that the above device is only an example, and other existing or future devices, if applicable to this application, shall also be included in the protection scope of this application and hereby incorporated by reference.

In the descriptions of this application, "a plurality of" means two or more, unless otherwise definitely and specifically defined.

FIG. 1 illustrates a typical application scenario of this application. A user equipment generates a connection request including connection authentication information, and sends the connection request to a wireless routing device. After connection authentication on the connection request succeeds, the user equipment is connected to the wireless routing device, and receives connection success information sent by the wireless routing device. The connection authentication information used for performing connection authentication is also generated by the user equipment. Connection authentication on the connection request may be completed by the wireless routing device. Alternatively, the connection request may be sent by the wireless routing device to a corresponding network device, and the network device completes connection authentication on the connection request.

FIG. 2 illustrates a method for establishing a connection to a wireless access point at a user equipment side according to one aspect of this application. The method includes step S11 and step S12. In step S11, a user equipment sends, based on an operation of establishing a connection to a target wireless access point by a user in an application of the user equipment, a connection request to a wireless routing device corresponding to the target wireless access point, the connection request including connection authentication information generated by the user equipment. In step S12, connection success information sent by the wireless routing device after connection authentication on the connection request succeeds is received.

In particular, in step S11, the connection request is sent, based on the operation of establishing a connection to the target wireless access point by the user in the application of the user equipment, to the wireless routing device corresponding to the target wireless access point, the connection request including the connection authentication information generated by the user equipment. The connection authentication information used for performing connection authentication is locally generated by the user equipment. For example, a wireless connection application is installed on a user equipment operated by a user, and the user may establish a wireless connection between the user equipment and a to-be-connected target wireless access point using the wireless connection application. A wireless connection request is generated based on the connection operation of the user in the wireless connection application. The wireless connection request is based on a unified authentication user name, and includes connection authentication information used for performing authentication on the user equipment or a user identity. The connection authentication information is locally generated by the user equipment, and may be generated based on user identity information, user equipment identification information, a user equipment serial number, and the like. The connection request is sent to the target wireless access point. The target wireless access point corresponds to a wireless routing device. For example, the wireless routing device provides a wireless signal of the target wireless access point, and the user equipment can communicate with the target wireless access point after detecting the wireless signal. The connection authentication information is locally generated by the user equipment, and the user equipment does not need to request the connection authentication information from a network device in advance, thereby improving connection operation efficiency. In addition, because an intermediate link is reduced, a possibility that the connection authentication information is intercepted by an illegal user is greatly reduced, and authentication on validity of the connection authentication information is facilitated, thereby improving system security.

Then, in step S12, the user equipment receives the connection success information sent by the wireless routing device. The connection success information is sent by the wireless routing device after connection authentication on the connection request sent by the user equipment succeeds. For example, authentication is performed based on the connection authentication information included in the wireless connection request. An authentication process may include: sending the connection request or the connection authentication information sent by the user equipment to a corresponding network device such as an authentication server, and determining whether authentication succeeds or fails based on information returned by the network device. Alternatively, connection authentication may be locally completed by the wireless routing device. For example, the wireless routing device performs authentication on the user equipment based on the connection authentication information included in the wireless connection request. When authentication on the user equipment succeeds, the wireless connection between the user equipment and the wireless access point is established, and the connection success information is sent to the user equipment.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information is locally generated by the user equipment $UE_1$ after the user equipment $UE_1$ detects the connection instruction, and is used for performing connection authentication on the connection request, to identify whether the user equipment $UE_1$ sending the connection request has corresponding permission or whether the corresponding user $U_1$ has corresponding permission. After receiving the connection request or the connection authentication information in the connection request, the wireless routing device WR or an authentication server performs authentication on the connection authentication information, and checks whether the user equipment $UE_1$ or the user $U_1$ has the corresponding permission. When connection authentication on the connection request succeeds, a wireless connection between the user equipment $UE_1$ and the wireless access point provided by the wireless routing device WR is established, and connection success information is sent to the user equipment $UE_1$. The user equipment $UE_1$ is successfully connected to the wireless access point. An authentication operation may include: sending the connection authentication information to the authentication server, and determining whether authentication succeeds or fails based on information returned by the authentication server. Alternatively, authentication may be locally completed by the wireless routing device WR. Service data information between the user equipment and the wireless access point not only can be used to identify the permission of the user $U_1$ or the user equipment $UE_1$, but also can be used to count user connection data, such as a number of connection times and connection duration of a specific user or a specific user equipment. When the authentication server performs authentication, an authentication success message or an authentication failure message may be returned based on the RADIUS protocol. For example, "Access-Accept" is returned if authentication succeeds, and "Access-Reject" is returned if authentication fails.

Preferably, referring to FIG. 3, step S11 further includes substep S11a and substep S11b. In substep S11a, the user equipment generates the connection authentication information based on service data information for communication between the user equipment and the target wireless access point when the operation of establishing a connection to the target wireless access point by the user in the application of the user equipment is obtained. In substep S11b, the user equipment sends the connection request to the wireless routing device corresponding to the target wireless access point, the connection request including the connection authentication information. For example, a user equipment detects an operation of establishing a connection to a target wireless access point by a user in a wireless connection application, the wireless connection application being installed on the user equipment. When the connection operation of the user is obtained, a wireless connection request is generated based on the connection operation of the user in the wireless connection application. The wireless connection request is based on a unified authentication user name, and includes connection authentication information used for performing authentication on the user equipment or a user identity. The connection authentication information is generated based on service data in a process of communication between the user equipment and the wireless access point, such as user equipment identification information, identification information (for example, a MAC address) of a wireless routing device, a system time for the user to perform the connection operation, a communications protocol version currently used by the wireless connection application, and/or current version information of the wireless connection application. The connection request is sent to the target wireless access point to perform connection authentication based on the connection authentication information. The target wireless access point corresponds to a wireless routing device, for example, the target wireless access point is provided by the wireless routing device. The service data information between the user equipment and the wireless access point not only can be used to identify permission of the user or the user equipment, but also can be used to count user connection data, such as a number of connection times and connection duration of a specific user or a specific user equipment.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information includes a communications protocol currently used by the wireless connection application, a current application version of the wireless connection application, a user equipment number uniquely assigned by the wireless connection application to the user equipment, and system time information of the user equipment when the connection instruction is triggered. Fields are connected using a special symbol. After receiving the connection request or the connection authentication information in the connection request, the wireless routing device WR or an authentication server performs authentication on the connection authentication information, and checks whether the user equipment $UE_1$ corresponding to the user equipment number has corresponding permission. When connection authentication on the connection request succeeds, a wireless connection between the user equipment $UE_1$ and the wireless access point provided by the wireless routing device WR is established, and connection success information is sent to the user equipment $UE_1$. The user equipment $UE_1$ is successfully connected to the wireless access point. An authentication operation may include: sending the user equipment number corresponding to the user equipment $UE_1$ to the authentication server, and determining whether authentication succeeds or fails based on information returned by the authentication server. Alternatively, authentication may be locally completed by the wireless routing device WR. For example, content of one piece of connection authentication information is "1.0;2.0;1234567890abcdef;20100312051730200", a version of the communications protocol being "1.0", the application version being "2.0", the user equipment number being "1234567890abcdef", and the system time information being "20100312051730200" (a system time being accurate to milliseconds). The fields are connected to and separated from each other using ";". After receiving the connection request and obtaining the piece of connection authentication information, the authentication server determines the meaning of each field in the connection authentication information based on the communications protocol version information "1.0", and determines, based on the user equipment number "1234567890abcdef", whether the corresponding user equipment has permission to establish a connection to the wireless routing device WR. If the user equipment has the permission to establish a connection to the wireless routing device WR, "authentication success" information is returned to the wireless routing device. In order to remove a special character in the connection authentication information, base64 encoding may be performed on the service data information in advance.

Preferably, that the connection authentication information includes the service data information and additional identification information generated based on the service data information means that the connection authentication information locally generated by the user equipment includes not only the service data information for communication between the user equipment and the wireless routing device, but also the additional identification information further generated based on the service data information and a preset algorithm. Because the additional identification information is generated based on the preset algorithm, when the wireless routing device or the authentication server can generate additional identification information the same as that in the connection request based on the same algorithm, it may be determined that the connection request is sent by a legal device, and a connection authentication operation may be further performed. Otherwise, it is quite likely that the connection authentication information is forged by an illegal device. For example, a connection request sent by a legal device is hijacked, and the connection request may be directly rejected. The connection authentication information including the additional identification information may be used to identify a connection request sent by an illegal device, thereby further enhancing system security.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information includes service data information for communication between the user equipment and the wireless routing device, and additional identification information generated based on the service data information and a preset algorithm. First, the wireless connection application obtains the service data information, the service data information including a communications protocol currently used by the wireless connection application, a current application version of the wireless connection application, a user equipment number uniquely assigned by the wireless connection application to the user equipment, and system time information of the user equipment when the connection instruction is triggered. After the service data information is obtained, all or a part of the service data information is processed based on the preset algorithm, for example, operations such as encryption, shifting, and hashing are performed to obtain the additional identification information. Fields in the service data information and the obtained additional identification information are used as fields in the connection authentication information, and the fields are separated using a special symbol. After receiving the connection request, the wireless routing device or an authentication server first generates the additional identification information based on the service data information and the same algorithm, and compares the generated additional identification information with the additional identification information in the connection request. If the generated additional identification information is inconsistent with the additional identification information in the connection request, authentication failure information is directly returned. If the generated additional identification information is consistent with the additional identification information in the connection request, authentication is performed on the user equipment number, and it is checked whether the user equipment $UE_1$ corresponding to the user equipment number has corresponding permission. When connection authentication on the connection request succeeds, authentication success information is returned, a wireless connection between the user equipment $UE_1$ and the wireless access point provided by the wireless routing device WR is established, and connection success information is sent to the user equipment $UE_1$. The user equipment $UE_1$ is successfully connected to the wireless access point. An authentication operation may include: sending the user equipment number corresponding to the user equipment $UE_1$ to the authentication server, and determining whether authentication succeeds or fails based on information returned by the authentication server. Alternatively, authentication may be locally completed by the wireless routing device WR. For example, a version of the communications protocol used by the wireless connection application is "1.0", the application version is "2.0", the user equipment number is "1234567890abcdef", and the system time information is "20100312051730200" (a system time being accurate to milliseconds). A preset operation is performed based on the service data information to obtain additional identification information "qwerasdf", and the additional identification information and the service data information are used as content of the connection authentication information. In this case, the connection authentication information is: "1.0;2.0;1234567890abcdef; 20100312051730200;qwerasdf". After receiving the connection request and obtaining the piece of connection authentication information, the authentication server determines the meaning of each field in the connection authentication information based on the communications protocol version information "1.0", generates additional identification information based on the service data information part "1.0; 2.0; 1234567890abcdef; 20100312051730200" and the same algorithm, and compares the generated additional identification information with "qwerasdf". If the generated additional identification information is inconsistent with "qwerasdf", authentication failure information is returned. If the generated additional identification information is inconsistent with "qwerasdf", it is determined, based on the user equipment number "1234567890abcdef", whether the corresponding user equipment has permission to establish a connection to the wireless routing device WR. If the user equipment has the permission to establish a connection to the wireless routing device WR, "authentication success" information is returned to the wireless routing device. In order to remove a special character in the connection authentication information, base64 encoding may be performed on the service data information in advance. When the authentication server performs authentication, an authentication success message or an authentication failure message may be returned based on the RADIUS protocol. For example, "Access-Accept" is returned if authentication succeeds, and "Access-Reject" is returned if authentication fails.

Preferably, substep S11a further includes substep S11a1 (not shown) and substep s11a2 (not shown). In substep S11a1 (not shown), the user equipment preprocesses on the service data information for communication between the user equipment and the target wireless access point to obtain the additional identification information when the operation of establishing a connection to the target wireless access point by the user in the application of the user equipment is obtained. In substep S11a2 (not shown), the user equipment generates the connection authentication information, the connection authentication information including the service data information and the additional identification information. For example, a user equipment detects an operation of establishing a connection to a target wireless access point by a user in a wireless connection application, the wireless connection application being installed on the user equipment. When the connection operation of the user is obtained, a wireless connection request is generated based on the connection operation of the user in the wireless connection application. The wireless connection request is based on a unified authentication user name, and includes connection authentication information for performing authentication on the user equipment or a user identity, and additional identification information generated based on the connection authentication information. The connection authentication information is generated based on service data in a process of communication between the user equipment and the wireless access point, such as user equipment identification information, identification information (for example, a MAC address) of a wireless routing device, a system time for the user to perform the connection operation, a communications protocol version currently used by the wireless connection application, and/or current version information of the wireless connection application. The connection request is sent to the target wireless access point to perform connection authentication based on the connection authentication information. The target wireless access point corresponds to a wireless routing device, for example, the target wireless access point is provided by the wireless routing device. The service data information between the user equipment and the wireless access point not only can be used to identify permission of the user or the user equipment, but also can be used to count user connection data, such as a number of connection times and connection duration of a specific user or a specific user equipment.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information includes service data information for communication between the user equipment and the wireless routing device, and additional identification information generated based on the service data information and a preset algorithm. First, the wireless connection application obtains the service data information, the service data information including a communications protocol currently used by the wireless connection application, a current application version of the wireless connection application, a user equipment number uniquely assigned by the wireless connection application to the user equipment, and system time information of the user equipment when the connection instruction is triggered. After the service data information is obtained, all or a part of the service data information is processed based on the preset algorithm, for example, operations such as encryption, shifting, and hashing are performed to obtain the additional identification information. Fields in the service data information and the obtained additional identification information are used as fields in the connection authentication information, and the fields are separated using a special symbol. After receiving the connection request, the wireless routing device or an authentication server first generates the additional identification information based on the service data information and the same algorithm, and compares the generated additional identification information with the additional identification information in the connection request. If the generated additional identification information is inconsistent with the additional identification information in the connection request, authentication failure information is directly returned. If the generated additional identification information is consistent with the additional identification information in the connection request, authentication is performed based on the user equipment number, and it is checked whether the user equipment $UE_1$ corresponding to the user equipment number has corresponding permission. When connection authentication on the connection request succeeds, authentication success information is returned, a wireless connection between the user equipment $UE_1$ and the wireless access point provided by the wireless routing device WR is established, and connection success information is sent to the user equipment $UE_1$. The user equipment $UE_1$ is successfully connected to the wireless access point. An authentication operation may include: sending the connection request or the connection authentication information to the authentication server, and determining whether authentication succeeds or fails based on information returned by the authentication server. Alternatively, authentication may be locally completed by the wireless routing device WR. For example, a version of the communications protocol used by the wireless connection application is "1.0", the application version is "2.0", the user equipment number is "1234567890abcdef", and the system time information is "20100312051730200" (a system time being accurate to milliseconds). A preset operation is performed based on the service data information to obtain additional identification information "qwerasdf", and the additional identification information and the service data information are used as content of the connection authentication information. In this case, the connection authentication information is: "1.0;2.0;1234567890abcdef; 20100312051730200;qwerasdf". After receiving the connection request and obtaining the piece of connection authentication information, the authentication server determines the meaning of each field in the connection authentication information based on the communications protocol version information "1.0", generates additional identification information based on the service data information part "1.0; 2.0; 1234567890abcdef; 20100312051730200" and the same algorithm, and compares the generated additional identification information with "qwerasdf". If the generated additional identification information is inconsistent with "qwerasdf", authentication failure information is returned. If the generated additional identification information is inconsistent with "qwerasdf", it is determined, based on the user equipment number "1234567890abcdef", whether the corresponding user equipment has permission to establish a connection to the wireless routing device WR. If the user equipment has the permission to establish a connection to the wireless routing device WR, "authentication success" information is returned to the wireless routing device. In order to remove a special character in the connection authentication information, base64 encoding may be performed on the service data information in advance. When the authentication server performs authentication, an authentication success message or an authentication failure message may be returned based on the RADIUS protocol. For example, "Access-Accept" is returned if authentication succeeds, and "Access-Reject" is returned if authentication fails.

Preferably, preprocessing in substep S11a1 (not shown) includes at least one of the following: (1) hash processing; and (2) encryption processing. For example, when the additional identification information is generated based on the service data information, the additional identification information may be obtained through calculation using a hash function, may be obtained through encryption using an encryption algorithm, or may be obtained by a combination of calculation using a hash function and encryption using an encryption algorithm. Certainly, other data processing manners such as shifting, negation, and exclusive OR may also be combined on this basis.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information includes service data information for communication between the user equipment and the wireless routing device, and additional identification information generated based on the service data information and a preset algorithm. First, the wireless connection application obtains the service data information, the service data information including a communications protocol currently used by the wireless connection application, a current application version of the wireless connection application, a user equipment number uniquely assigned by the wireless connection application to the user equipment, and system time information of the user equipment when the connection instruction is triggered. After the service data information is obtained, all or a part of the service data information is processed based on the preset algorithm, for example, operations such as encryption, shifting, and hashing are performed to obtain the additional identification information. Fields in the service data information and the obtained additional identification information are used as fields in the connection authentication information, and the fields are separated using a special symbol. After receiving the connection request, the wireless routing device or an authentication server first generates the additional identification information based on the service data information and the same algorithm, and compares the generated additional identification information with the additional identification information in the connection request. If the generated additional identification information is inconsistent with the additional identification information in the connection request, authentication failure information is directly returned. If the generated additional identification information is consistent with the additional identification information in the connection request, authentication is performed based on the user equipment number, and it is checked whether the user equipment $UE_1$ corresponding to the user equipment number has corresponding permission. When connection authentication on the connection request succeeds, authentication success information is returned, a wireless connection between the user equipment $UE_1$ and the wireless access point provided by the wireless routing device WR is established, and connection success information is sent to the user equipment $UE_1$. The user equipment $UE_1$ is successfully connected to the wireless access point. An authentication operation may include: sending the connection request or the connection authentication information to the authentication server, and determining whether authentication succeeds or fails based on information returned by the authentication server. Alternatively, authentication may be locally completed by the wireless routing device WR. For example, a version of the communications protocol used by the wireless connection application is "1.0", the application version is "2.0", the user equipment number is "1234567890abcdef", and the system time information is "20100312051730200" (a system time being accurate to milliseconds). A preset operation is performed based on the service data information to obtain additional identification information "qwerasdf", and the additional identification information and the service data information are used as content of the connection authentication information. In this case, the connection authentication information is: "1.0;2.0;1234567890abcdef; 20100312051730200;qwerasdf". After receiving the connection request and obtaining the piece of connection authentication information, the authentication server determines the meaning of each field in the connection authentication information based on the communications protocol version information "1.0", generates additional identification information based on the service data information part "1.0; 2.0; 1234567890abcdef; 20100312051730200" and the same algorithm, and compares the generated additional identification information with "qwerasdf". If the generated additional identification information is inconsistent with "qwerasdf", authentication failure information is returned. If the generated additional identification information is inconsistent with "qwerasdf", it is determined, based on the user equipment number "1234567890abcdef", whether the corresponding user equipment has permission to establish a connection to the wireless routing device WR. If the user equipment has the permission to establish a connection to the wireless routing device WR, "authentication success" information is returned to the wireless routing device. In order to remove a special character in the connection authentication information, base64 encoding may be performed on the service data information in advance. In order to further improve security, data processing may be performed on the additional identification information for a plurality of times, such as a plurality of times of encryption and/or hashing. When the authentication server performs authentication, an authentication success message or an authentication failure message may be returned based on the RADIUS protocol. For example, "Access-Accept" is returned if authentication succeeds, and "Access-Reject" is returned if authentication fails.

Certainly, a person skilled in the art should understand that the above data processing manners are merely examples, and other existing or future data processing manners applicable to this application shall fall within the protection scope of this application, and are included herein by reference.

Preferably, the service data information includes at least one of the following: (1) user equipment identification information of the user equipment; (2) routing device identification information of the wireless routing device; (3) time information corresponding to the operation of establishing a connection to the target wireless access point; (4) protocol version information for communication between the user equipment and the wireless access point; and (5) user identification information of the user in the application. Authentication may be performed on the user equipment or the user identity based on the user equipment identification information (for example, the user equipment number) or the user identification information (for example, a user name and a password of the user in the application). The time information corresponding to the operation of establishing a connection to the target wireless access point may be used to present a replay attack of a malicious user. The time information may be actual system time information or timestamp information. The communication protocol version information is beneficial to achieve a diversified product structure.

Preventing the replay attack using the time information may be implemented as follows: It may be determined whether a same message has been received, and if yes, it is determined that the wireless connection request is a replay message, and the wireless connection request is rejected. Alternatively, one piece of time information may be generated on each of a server side and a client, and when a time difference between the two is within a time threshold, it is determined that the wireless connection request is valid and is not a replay message.

FIG. 4 illustrates a method for establishing a connection to a wireless access point at a wireless routing device side according to another aspect of this application. The method includes step S21, step S22, and step S23. In step S21, a wireless routing device receives a connection request about a target wireless access point sent by a user equipment, the connection request including connection authentication information generated by the user equipment. In step S22, the wireless routing device performs connection authentication on the connection request based on the connection authentication information. In step S23, the wireless routing device accepts the connection request and returns connection success information to the user equipment when connection authentication on the connection request succeeds.

In particular, in step S21, the wireless routing device receives the connection request about the target wireless access point sent by the user equipment, the connection request including the connection authentication information generated by the user equipment. For example, a wireless connection application is installed on a user equipment operated by a user, and the user may establish a wireless connection between the user equipment and a to-be-connected target wireless access point using the wireless connection application. A wireless connection request is generated based on the connection operation of the user in the wireless connection application. The wireless connection request is based on a unified authentication user name, and includes connection authentication information used for performing authentication on the user equipment or a user identity. The connection authentication information is locally generated by the user equipment, and may be generated based on user identity information, user equipment identification information, a user equipment serial number, and the like. The connection request is sent to the target wireless access point. The target wireless access point corresponds to a wireless routing device. For example, the wireless routing device provides a wireless signal of the target wireless access point, and the user equipment can communicate with the target wireless access point after detecting the wireless signal. The connection authentication information is locally generated by the user equipment, and the user equipment does not need to request the connection authentication information from a network device in advance, thereby improving connection operation efficiency. In addition, because an intermediate link is reduced, a possibility that the connection authentication information is intercepted by an illegal user is greatly reduced, and authentication on validity of the connection authentication information is facilitated, thereby improving system security.

Subsequently, in step S22, the wireless routing device performs connection authentication on the connection request based on the connection authentication information. For example, the connection request sent by the user equipment is sent to a corresponding network device such as an authentication server, and it is determined whether authentication succeeds or fails based on information returned by the network device. Alternatively, connection authentication may be locally completed by the wireless routing device. For example, the wireless routing device performs authentication on the user equipment or the user identity based on the connection authentication information included in the wireless connection request.

Finally, in step S23, the wireless routing device accepts the connection request and returns the connection success information to the user equipment when connection authentication on the connection request succeeds. For example, if the connection request sent by the user equipment is sent to the corresponding network device for connection authentication, when the network device returns "authentication success" information, the wireless routing device accepts the connection request of the user equipment, establishes a wireless connection between the target wireless access point and the user equipment, and returns "connection success" information to the user equipment. Alternatively, if the wireless routing device locally performs connection authentication on the wireless connection request, for example, performs authentication based on the connection authentication information in the connection request, after the authentication succeeds, the wireless routing device establishes a wireless connection between the target wireless access point and the user equipment, and returns "connection success" information to the user equipment. The user equipment may present the "connection success" information to the user of the user equipment.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information is locally generated by the user equipment $UE_1$ after the user equipment $UE_1$ detects the connection instruction, and is used for performing connection authentication on the connection request, to identify whether the user equipment $UE_1$ sending the connection request has corresponding permission or whether the corresponding user $U_1$ has corresponding permission. After receiving the connection request or the connection authentication information in the connection request, the wireless routing device WR or an authentication server performs authentication on the connection authentication information, and checks whether the user equipment $UE_1$ or the user $U_1$ has the corresponding permission. When connection authentication on the connection request succeeds, a wireless connection between the user equipment $UE_1$ and the wireless access point provided by the wireless routing device WR is established, and connection success information is sent to the user equipment $UE_1$. The user equipment $UE_1$ is successfully connected to the wireless access point. An authentication operation may include: sending the connection request or the connection authentication information to the authentication server, and determining whether authentication succeeds or fails based on information returned by the authentication server. Alternatively, authentication may be locally completed by the wireless routing device WR. Service data information between the user equipment and the wireless access point not only can be used to identify the permission of the user $U_1$ or the user equipment $UE_1$, but also can be used to count user connection data, such as a number of connection times and connection duration of a specific user or a specific user equipment. When the authentication server performs authentication, an authentication success message or an authentication failure message may be returned based on the RADIUS protocol. For example, "Access-Accept" is returned if authentication succeeds, and "Access-Reject" is returned if authentication fails.

Preferably, in step S22, the wireless routing device sends the connection request to a corresponding network device, and the network device performs connection authentication. The wireless routing device first sends the connection authentication information to the corresponding network device, and then receives the authentication result information returned by the network device about the connection authentication information.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information is locally generated by the user equipment $UE_1$ after the user equipment $UE_1$ detects the connection instruction, and is used for performing connection authentication on the connection request, to identify whether the user equipment $UE_1$ sending the connection request has corresponding permission or whether the corresponding user $U_1$ has corresponding permission. After receiving the connection request, the wireless routing device WR forwards the connection request to a corresponding authentication server. The authentication server performs authentication on the connection authentication information, and checks whether the user equipment $UE_1$ or the user $U_1$ has the corresponding permission. "Authentication success" information is returned to the wireless routing device WR when connection authentication on the connection request succeeds. The wireless routing device establishes a wireless connection between the user equipment $UE_1$ and the wireless access point provided by the wireless routing device WR, and sends connection success information to the user equipment $UE_1$. The user equipment $UE_1$ is successfully connected to the wireless access point. Service data information between the user equipment and the wireless access point not only can be used to identify the permission of the user $U_1$ or the user equipment $UE_1$, but also can be used to count user connection data, such as a number of connection times and connection duration of a specific user or a specific user equipment. When the authentication server performs authentication, an authentication success message or an authentication failure message may be returned based on the RADIUS protocol. For example, "Access-Accept" is returned if authentication succeeds, and "Access-Reject" is returned if authentication fails.

Figure 6:
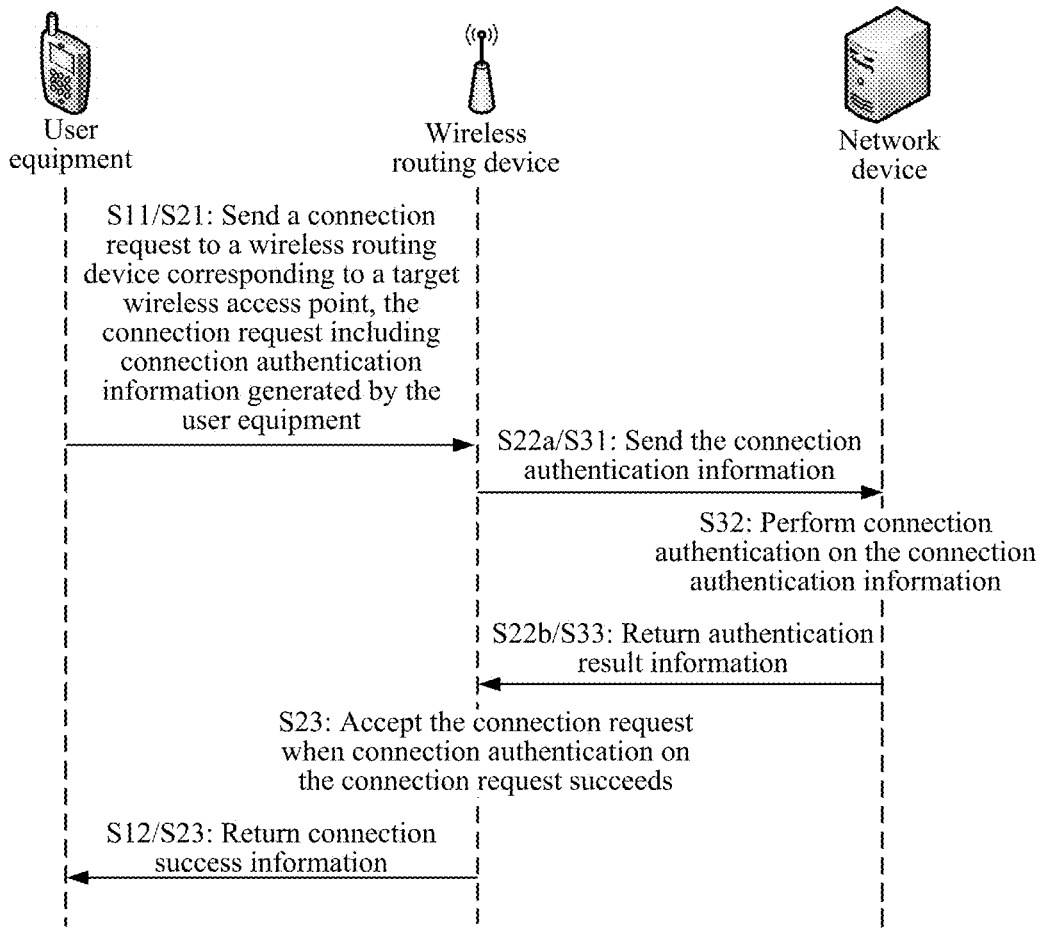
FIG. 6 is a flowchart of a method for establishing a connection to a wireless access point according to an embodiment of this application.

Referring to FIG. 5 and FIG. 6, according to still another aspect of this application, a method for establishing a connection to a wireless access point at a network device side is provided. The method includes step S31, step S32, and step S33. In step S31, a network device receives connection authentication information that is sent by a corresponding wireless routing device and that is about requesting performed by a user equipment to establish a connection to a target wireless access point, the connection authentication information being generated by the user equipment. In step S32, the network device performs connection authentication on the connection authentication information. In step S33, the network device returns corresponding authentication result information to the wireless routing device. For example, after receiving the connection request of the user equipment, the wireless routing device sends the connection request to the corresponding network device, the wireless connection request including the connection authentication information locally generated by the user equipment. The network device performs connection authentication on the connection request based on the connection authentication information, and then returns an authentication success or an authentication failure to the wireless routing device. When the network device returns the authentication success to the wireless routing device, the wireless routing device may establish a wireless connection between the wireless routing device and the user equipment.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information is locally generated by the user equipment $UE_1$ after the user equipment $UE_1$ detects the connection instruction, and is used for performing connection authentication on the connection request, to identify whether the user equipment $UE_1$ sending the connection request has corresponding permission or whether the corresponding user $U_1$ has corresponding permission. After receiving the connection request, the wireless routing device WR forwards the connection request to a corresponding authentication server. The authentication server performs authentication on the connection authentication information, and checks whether the user equipment $UE_1$ or the user $U_1$ has the corresponding permission. "Authentication success" information is returned to the wireless routing device WR when connection authentication on the connection request succeeds. The wireless routing device establishes a wireless connection between the user equipment $UE_1$ and the wireless access point provided by the wireless routing device WR, and sends connection success information to the user equipment $UE_1$. The user equipment $UE_1$ is successfully connected to the wireless access point. Service data information between the user equipment and the wireless access point not only can be used to identify the permission of the user $U_1$ or the user equipment $UE_1$, but also can be used to count user connection data, such as a number of connection times and connection duration of a specific user or a specific user equipment. When the authentication server performs authentication, an authentication success message or an authentication failure message may be returned based on the RADIUS protocol. For example, "Access-Accept" is returned if authentication succeeds, and "Access-Reject" is returned if authentication fails.

Preferably, the connection authentication information includes service data information for communication between the user equipment and the wireless access point, and additional identification information generated based on the service data information. In step S32, the network device performs connection authentication on the connection authentication information based on the service data information and the additional identification information. The service data information between the user equipment and the wireless access point not only can be used to identify the permission of the user or the user equipment, but also can be used to count user connection data, such as a number of connection times and connection duration of a specific user or a specific user equipment. The connection authentication information including the additional identification information may be used to identify a connection request sent by an illegal device, thereby further enhancing system security.

For example, a user $U_1$ holds a user equipment (for example, a mobile phone) $UE_1$, and the user equipment $UE_1$ may serve as a wireless network terminal. The user equipment $UE_1$ detects a wireless access point signal provided by a surrounding wireless routing device WR. A wireless connection application for establishing a connection to a wireless access point is installed in the user equipment $UE_1$. The user $U_1$ selects an icon of the wireless access point provided by the wireless routing device WR on a touchscreen of the user equipment $UE_1$, and clicks a "Connect" button to trigger a connection instruction. The user equipment $UE_1$ sends a connection request to the wireless routing device WR after detecting the connection instruction. The wireless connection request is based on a unified authentication user name "wifimasterkey", and includes connection authentication information. The connection authentication information includes service data information for communication between the user equipment and the wireless routing device, and additional identification information generated based on the service data information and a preset algorithm. First, the wireless connection application obtains the service data information, the service data information including a communications protocol currently used by the wireless connection application, a current application version of the wireless connection application, a user equipment number uniquely assigned by the wireless connection application to the user equipment, and system time information of the user equipment when the connection instruction is triggered. After the service data information is obtained, all or a part of the service data information is processed based on the preset algorithm, for example, operations such as encryption, shifting, and hashing are performed to obtain the additional identification information. Fields in the service data information and the obtained additional identification information are used as fields in the connection authentication information, and the fields are separated using a special symbol. After receiving the connection request, the wireless routing device or an authentication server first generates the additional identification information based on the service data information and the same algorithm, and compares the generated additional identification information with the additional identification information in the connection request. If the generated additional identification information is inconsistent with the additional identification information in the connection request, authentication failure information is directly returned. If the generated additional identification information is consistent with the additional identification information in the connection request, authentication is performed based on the user equipment number, and it is checked whether the user equipment $UE_1$ corresponding to the user equipment number has corresponding permission. When connection authentication on the connection request succeeds, authentication success information is returned, a wireless connection between the user equipment $UE_1$ and the wireless access point provided by the wireless routing device WR is established, and connection success information is sent to the user equipment $UE_1$. The user equipment $UE_1$ is successfully connected to the wireless access point. An authentication operation include: sending the connection request to the authentication server, and determining whether authentication succeeds or fails based on information returned by the authentication server. Alternatively, authentication may be locally completed by the wireless routing device WR.

For example, a version of the communications protocol used by the wireless connection application is "1.0", the application version is "2.0", the user equipment number is "1234567890abcdef", and the system time information is "20100312051730200" (a system time being accurate to milliseconds). A preset operation is performed based on the service data information to obtain additional identification information "qwerasdf", and the additional identification information and the service data information are used as content of the connection authentication information. In this case, the connection authentication information is: "1.0;2.0; 1234567890abcdef;20100312051730200;qwerasdf". After receiving the connection request and obtaining the piece of connection authentication information, the authentication server determines the meaning of each field in the connection authentication information based on the communications protocol version information "1.0", generates additional identification information based on the service data information part "1.0;2.0;1234567890abcdef; 20100312051730200" and the same algorithm, and compares the generated additional identification information with "qwerasdf". If the generated additional identification information is inconsistent with "qwerasdf", authentication failure information is returned. If the generated additional identification information is inconsistent with "qwerasdf", it is determined, based on the user equipment number "1234567890abcdef", whether the corresponding user equipment has permission to establish a connection to the wireless routing device WR. If the user equipment has the permission to establish a connection to the wireless routing device WR, "authentication success" information is returned to the wireless routing device. In order to remove a special character in the connection authentication information, base64 encoding may be performed on the service data information in advance. When the authentication server performs authentication, an authentication success message or an authentication failure message may be returned based on the RADIUS protocol. For example, "Access-Accept" is returned if authentication succeeds, and "Access-Reject" is returned if authentication fails.

Figure 7:
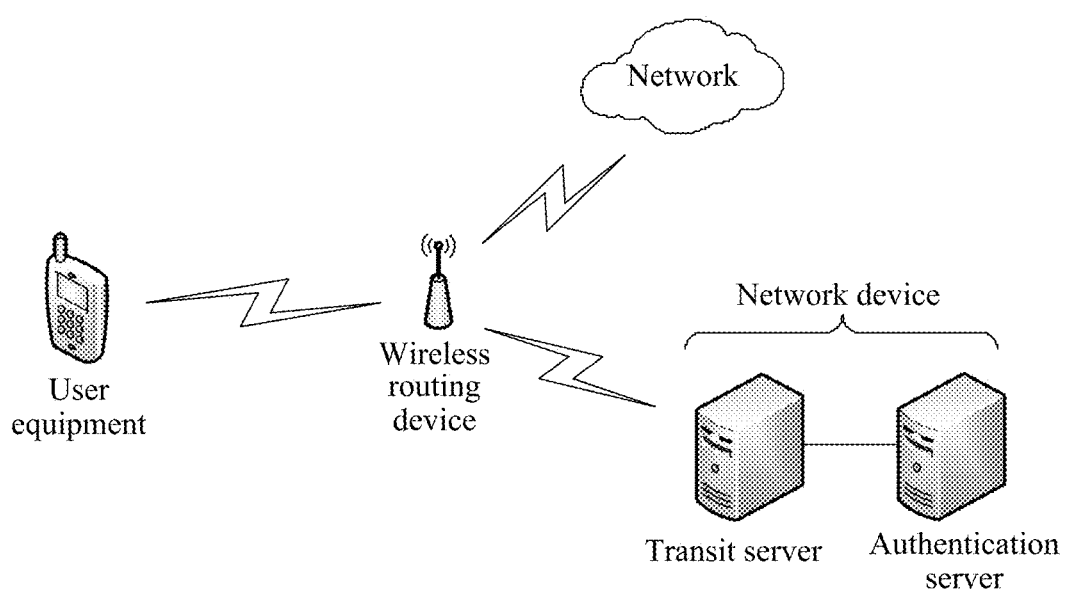
FIG. 7 is a system topology diagram for establishing a connection to a wireless access point according to another embodiment of this application.

In addition, referring to FIG. 7, a network device in this application may further include a transit server and an authentication server. A wireless connection request sent by a user equipment is sent to a wireless routing device, and the wireless routing device sends connection authentication information in the connection request to the authentication server using the transit server. After the authentication server performs a connection authentication operation on the connection authentication information, returned authentication result information is also sent to the wireless routing device using the transit server. There may be a plurality of transit servers in series or in parallel. The wireless connection request sent by the wireless routing device or the authentication password information in the wireless connection request may arrive at the authentication server after a plurality of times of transit. The transit server may be configured to count service data for communication between the user equipment and the wireless routing device, for example, count service data information included in the connection authentication information in the connection request.

According to one aspect of this application, a device for establishing a connection to a wireless access point at a user equipment side is provided, and the device includes:

a processor; and a memory configured to store a computer executable instruction that, when executed, causes the processor to perform the following operations:

sending, based on an operation of establishing a connection to a target wireless access point by a user in an application of a user equipment, a connection request to a wireless routing device corresponding to the target wireless access point, the connection request including connection authentication information generated by the user equipment, where for example, a wireless connection request is generated based on a connection operation of a user in a wireless connection application installed on a user equipment, the wireless connection request including connection authentication information used for performing authentication, and the connection authentication information being locally generated by the user equipment; sending the connection request to the target wireless access point, where the target wireless access point corresponds to a wireless routing device, for example, the target wireless access point is provided by the wireless routing device; and receiving connection success information sent by the wireless routing device after connection authentication on the connection request succeeds.

According to another aspect of this application, a device for establishing a connection to a wireless access point at a wireless routing device side is provided, and the device includes:

a processor; and a memory configured to store a computer executable instruction that, when executed, causes the processor to perform the following operations:

receiving a connection request about a target wireless access point sent by a user equipment, the connection request including connection authentication information generated by the user equipment, where for example, a wireless connection request is generated based on a connection operation of a user in a wireless connection application installed on a user equipment, the wireless connection request including connection authentication information used for performing authentication, and the connection authentication information being locally generated by the user equipment; sending the connection request to the target wireless access point, where the target wireless access point corresponds to a wireless routing device, for example, the target wireless access point is provided by the wireless routing device;

performing connection authentication on the connection request based on the authentication password information; and accepting the connection request and returning connection success information to the user equipment when connection authentication on the connection request succeeds.

According to still another aspect of this application, a device for establishing a connection to a wireless access point at a network device side is provided, and the device includes:

a processor; and a memory configured to store a computer executable instruction that, when executed, causes the processor to perform the following operations:

receiving connection authentication information that is sent by a corresponding wireless routing device and that is about requesting performed by a user equipment to establish a connection to a target wireless access point, the connection authentication information being generated by the user equipment;

performing connection authentication on the authentication password information; and returning corresponding authentication result information to the wireless routing device.

According to one aspect of this application, a computer readable medium including an instruction is provided, and when executed, the instruction causes a system to perform the following operations:

sending, based on an operation of establishing a connection to a target wireless access point by a user in an application of a user equipment, a connection request to a wireless routing device corresponding to the target wireless access point, the connection request including connection authentication information generated by the user equipment; and receiving connection success information sent by the wireless routing device after connection authentication on the connection request succeeds.

According to another aspect of this application, a computer readable medium including an instruction is provided, and when executed, the instruction causes a system to perform the following operations:

receiving a connection request about a target wireless access point sent by a user equipment, the connection request including connection authentication information generated by the user equipment;

performing connection authentication on the connection request based on the connection authentication information; and accepting the connection request and returning connection success information to the user equipment when connection authentication on the connection request succeeds.

According to still another aspect of this application, a computer readable medium including an instruction is provided, and when executed, the instruction causes a system to perform the following operations:

receiving connection authentication information that is sent by a corresponding wireless routing device and that is about requesting performed by a user equipment to establish a connection to a target wireless access point, the connection authentication information being generated by the user equipment;

performing connection authentication on the connection authentication information; and returning corresponding authentication result information to the wireless routing device.

It should be noted that this application may be implemented in software and/or a combination of software and hardware, for example, may be implemented by using an application specific integrated circuit (ASIC), a general-purpose computer, or another similar hardware device. In an embodiment, the software program in this application may be executed by a processor to implement the steps or functions described above. Similarly, the software program (including related data structures) in this application may be stored in a computer-readable recording medium such as a RAM memory, a magnetic or optical drive or a floppy disk, and the like. In addition, some of the steps or functions of this application may be implemented in hardware, for example, a circuit that cooperates with a processor to perform the steps or functions.

In addition, a part of this application may be applied to a computer program product, such as a computer program instruction. The computer program instruction, when executed by a computer, may invoke or provide a method and/or technical solution according to this application by operations of the computer. A person skilled in the art should understand that a form of the computer program instruction in the computer-readable medium includes, but is not limited to, a source file, an executable file, an installation package file, and the like. Accordingly, a manner in which the computer program instruction is executed by the computer includes, but is not limited to: The computer directly executes the instruction, or the computer compiles the instruction and then executes the corresponding compiled program, or the computer reads and executes the instruction, or the computer reads and installs the instruction and then executes the corresponding installed program. In this case, the computer-readable medium may be any available computer readable-storage medium or communication medium that can be accessed by the computer.

Communication media include media that can be transferred from one system to another system by communication signals including, for example, computer-readable instructions, data structures, program modules, or other data. Communication media may include conductive transmission media (such as cables and wires (for example, fiber optics, coaxial, and the like)) and wireless (transmission without conduction) media capable of propagating energy waves such as acoustic, electromagnetic, RF, microwave, and infrared. Computer readable instructions, data structures, program modules, or other data may be embodied, for example, as modulated data signals in a wireless medium (such as a carrier wave or a similar mechanism embodied as a part of the spread spectrum technology). The term "modulated data signal" refers to a signal whose one or more features are altered or set in such a manner as to encode information in the signal. Modulation may be analog, digital or hybrid modulation techniques.

As an example instead of limitation, the computer-readable storage medium includes volatile and non-volatile media, and removable and non-removable media implemented by using any method or technology for storing information such as computer-readable instructions, data structures, program modules, or other data. For example, the computer-readable storage medium includes, but is not limited to, volatile memories such as random access memories (RAM, DRAM, SRAM); and nonvolatile memories such as a flash memory, various read only memories (ROM, PROM, EPROM, EEPROM), magnetic and ferromagnetic/ferroelectric memories (MRAM, FeRAM); and magnetic and optical storage devices (hard disk, magnetic tape, CD, DVD); or other currently known media or media developed in the future and capable of storing computer-readable information/data used by computer systems.

In this case, an embodiment according to this application includes a device, and the device includes a memory for storing computer program instructions and a processor for executing program instructions. When the computer program instructions are executed by the processor, the device is triggered to perform the methods and/or technical solutions based on the foregoing embodiments according to this application.

It is apparent to a person skilled in the art that this application is not limited to details of the above exemplary embodiments, and this application may be implemented in other implementations without departing from the spirit or basic features of this application.

Therefore, the embodiments should be considered as exemplary and non-limiting from any point of view. The scope of this application is defined by the appended claims rather than the above descriptions. Therefore, all changes that fall within the meaning and scope of equivalents of the claims are included in this application. Any reference signs in the claims should not be construed as limiting the claims. In addition, it is apparent that the word "include" does not exclude other elements or steps and the singular does not exclude the plural. A plurality of units or devices described in the device claims may also be implemented by a unit or device by software or hardware. The words such as first, second, and the like are used to denote names and do not denote any particular order.

What is claimed is:

1. A method for establishing a connection to a wireless access point at a user equipment, wherein the method comprising:
    sending, based on an operation of establishing a connection to a target wireless access point by a user in an application of the user equipment, a connection request to a wireless routing device corresponding to the target wireless access point, wherein the connection request comprises connection authentication information generated by the user equipment;
    sending the connection authentication information to a network device through the wireless routing device, wherein, the network device includes a transit server and an authentication server, the connection authentication information comprises service data information and additional identification information, and the additional identification information is generated based on the service data information and a preset algorithm;
    performing a further connection authentication operation based on the service data information when the authentication server generates the same additional identification information as the additional identification information in the connection request based on the preset algorithm;
    sending connection success information to the wireless routing device when the authentication server determines the service data information is authenticated;
    receiving the connection success information sent by the wireless routing device after authentication of the connection request succeeds; and
    establishing a wireless connection between the user equipment and the wireless routing device.

2. The method according to claim 1, wherein, the step of sending, based on the operation of establishing the connection to the target wireless access point by the user in the application of the user equipment, the connection request to the wireless routing device corresponding to the target wireless access point, comprises:
    generating the connection authentication information based on the service data information for communication between the user equipment and the target wireless access point when the operation of establishing the connection to the target wireless access point by the user in the application of the user equipment is obtained; and
    sending the connection request to the wireless routing device corresponding to the target wireless access point, wherein the connection request comprises the connection authentication information.

3. The method according to claim 1, wherein, the connection authentication information comprises the service data information for communication between the user equipment and the target wireless access point and the additional identification information generated based on all or a part of the service data information.

4. The method according to claim 3, wherein the step of sending, based on the operation of establishing the connection to the target wireless access point by the user in the application of the user equipment, the connection request to the wireless routing device corresponding to the target wireless access point, comprises:
    preprocessing all or the part of the service data information for communication between the user equipment and the target wireless access point to obtain the additional identification information when the operation of establishing the connection to the target wireless access point by the user in the application of the user equipment is obtained;
    generating the connection authentication information, wherein the connection authentication information comprises the service data information and the additional identification information; and
    sending the connection request to the wireless routing device corresponding to the target wireless access point, wherein the connection request comprises the connection authentication information.

5. The method according to claim 4, wherein, the step of preprocessing all or the part of the service data information for communication between the user equipment and the target wireless access point to obtain the additional identification information when the operation of establishing the connection to the target wireless access point by the user in the application of the user equipment is obtained, comprises:
    obtaining the service data information for communication between the user equipment and the target wireless access point when the operation of establishing the connection to the target wireless access point by the user in the application of the user equipment is obtained;
    encoding the service data information; and
    preprocessing all or a part of encoded service data information to obtain the additional identification information.

6. The method according to claim 3, wherein, the service data information comprises at least one of the following:
   user equipment identification information of the user equipment;
   routing device identification information of the wireless routing device;
   time information corresponding to the operation of establishing the connection to the target wireless access point;
   protocol version information for communication between the user equipment and the wireless access point; or
   user identification information of the user in the application of the user equipment.

7. A method for establishing a connection to a wireless access point at a wireless routing device, wherein the method comprises:
   sending, based on an operation of establishing a connection to a target wireless access point by a user in an application of a user equipment, a connection request to the wireless routing device corresponding to the target wireless access point;
   receiving the connection request about the target wireless access point sent by the user equipment, wherein the connection request comprises connection authentication information generated by the user equipment;
   performing authentication on the connection request based on the connection authentication information; and
   accepting the connection request and returning connection success information to the user equipment when authentication of the connection request succeeds;
   wherein to establish the connection to the target wireless access point by the user equipment, the user equipment performs the following steps:
   sending, based on the operation of establishing the connection to the target wireless access point by the user in the application of the user equipment, the connection request to the wireless routing device corresponding to the target wireless access point, wherein the connection request comprises the connection authentication information generated by the user equipment;
   sending the connection authentication information to a network device through the wireless routing device, wherein, the network device includes a transit server and an authentication server, the connection authentication information comprises service data information and additional identification information, and the additional identification information is generated based on the service data information and a preset algorithm;
   performing a further connection authentication operation based on the service data information when the authentication server generates the same additional identification information as the additional identification information in the connection request based on the preset algorithm;
   sending the connection success information to the wireless routing device when the authentication server determines the service data information is authenticated;
   receiving the connection success information sent by the wireless routing device after authentication of the connection request succeeds; and
   establishing a wireless connection between the user equipment and the wireless routing device.

8. The method according to claim 7, wherein, the step of performing authentication on the connection request based on the connection authentication information, comprises:
   sending the connection authentication information to the network device; and
   receiving authentication result information returned by the network device.

9. A method for establishing a connection to a wireless access point at a network device, wherein the method comprises:
   receiving connection authentication information sent by a corresponding wireless routing device about requesting to establish a connection to a target wireless access point by a user equipment, wherein the connection authentication information is generated by the user equipment;
   performing connection authentication on the connection authentication information; and
   returning authentication result information to the wireless routing device;
   wherein to establish the connection to the target wireless access point by the user equipment, the user equipment performs the following steps:
   sending, based on an operation of establishing the connection to the target wireless access point by a user in an application of the user equipment, a connection request to the wireless routing device corresponding to the target wireless access point, wherein the connection request comprises the connection authentication information generated by the user equipment;
   sending the connection authentication information to the network device through the wireless routing device, wherein, the network device includes a transit server and an authentication server, the connection authentication information comprises service data information and additional identification information, and the additional identification information is generated based on the service data information and a preset algorithm;
   performing a further connection authentication operation based on the service data information when the authentication server generates the same additional identification information as the additional identification information in the connection request based on the preset algorithm;
   sending the connection success information to the wireless routing device when the authentication server determines the service data information is authenticated;
   receiving the connection success information sent by the wireless routing device after authentication of the connection request succeeds; and
   establishing a wireless connection between the user equipment and the wireless routing device.

10. The method according to claim 9, wherein, the connection authentication information comprises the service data information for communication between the user equipment and the wireless access point and the additional identification information generated based on the service data information, and connection authentication on the connection authentication information is performed based on the service data information and the additional identification information.

11. The method according to claim 10, wherein, the step of performing connection authentication on the connection authentication information, comprises:
    performing validity authentication on the connection authentication information based on the service data information and the additional identification information, wherein the authentication result information comprises a validity authentication result and a connection authentication result of the connection authentication information.

12. The method according to claim 11, wherein, the step of performing validity authentication on the connection authentication information based on the service data information and the additional identification information, comprises:

generating verification identification information based on the service data information and an identification information generation algorithm, wherein the additional identification information is generated based on the identification information generation algorithm; and performing validity authentication on the connection authentication information based on the additional identification information and the verification identification information.

13. The method according to claim 4, wherein the service data information comprises at least one of the following:

user equipment identification information of the user equipment;

routing device identification information of the wireless routing device;

time information corresponding to the operation of establishing the connection to the target wireless access point;

protocol version information for communication between the user equipment and the wireless access point; or user identification information of the user in the application of the user equipment.

14. The method according to claim 5, wherein the service data information comprises at least one of the following:

user equipment identification information of the user equipment;

routing device identification information of the wireless routing device;

time information corresponding to the operation of establishing the connection to the target wireless access point;

protocol version information for communication between the user equipment and the wireless access point; or user identification information of the user in the application of the user equipment.

* * * * *